(12) United States Patent
Omura

(10) Patent No.: US 6,447,189 B1
(45) Date of Patent: Sep. 10, 2002

(54) DETECTION MECHANISM, CARRIAGE MONITORING DEVICE AND PRINTER INCORPORATING THE SAME

(75) Inventor: Kunio Omura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 41 days.

(21) Appl. No.: 09/611,547

(22) Filed: Jul. 7, 2000

Related U.S. Application Data

(63) Continuation-in-part of application No. PCT/JP00/00052, filed on Jan. 6, 2000.

(51) Int. Cl.⁷ .................................................. B41J 29/18
(52) U.S. Cl. ...................................... 400/703; 400/315
(58) Field of Search ................................ 400/703, 313, 400/315, 319, 303, 306.2, 306.4, 357, 705

(56) References Cited

U.S. PATENT DOCUMENTS

| 5,090,829 A | | 2/1992 | Lee et al. | |
| 5,158,379 A | * | 10/1992 | Moriya et al. | 400/279 |
| 6,135,657 A | * | 10/2000 | Martinez et al. | 400/208 |

FOREIGN PATENT DOCUMENTS

| JP | 58-87063 | 5/1983 |
| JP | 61-51178 U | 4/1986 |
| JP | 1-202462 A | 8/1989 |
| JP | 4-124662 | 11/1992 |
| JP | 5-52719 U | 7/1993 |
| JP | 5-94713 U | 12/1993 |
| JP | 6-270487 | 9/1994 |
| JP | 7-186478 A | 7/1995 |
| JP | 7-298555 A | 11/1995 |
| JP | 7-309050 | 11/1995 |
| JP | 8-310072 | 11/1996 |
| JP | 9-14994 A | 1/1997 |
| JP | 9-126813 | 5/1997 |

* cited by examiner

Primary Examiner—Andrew H. Hirshfeld
Assistant Examiner—Darius N. Cone
(74) Attorney, Agent, or Firm—Nixon & Vanderhye P.C.

(57) ABSTRACT

A space for housing an optical sensor is formed between a detection gear of a drive transfer gear and a frame for supporting the detection gear. A detected part shaped like comb teeth is formed integrally on inner walls of the detection gear. The optical sensor is placed so that the detected part passes through a space between a photo emitter and a photo receptor of the optical sensor. Since the detection gear and the frame protect the optical sensor from stray light and interfering substances such as paper powder, or the like, a high-reliability, small-sized detection mechanism can be provided.

20 Claims, 10 Drawing Sheets

DETECTION MECHANISM, CARRIAGE MONITORING DEVICE AND PRINTER INCORPORATING THE SAME

CROSS-REFERENCE TO RELATED APPLICATION

This is a continuation-in-part application of PCT/JP00/00052 filed on Jan. 6, 2000.

BACKGROUND OF THE INVENTION

This invention relates to a detection mechanism in a drive mechanism of a printer, for example, and in particular to a device for monitoring the reciprocating operation of a carriage on which a print head is placed.

Generally, a serial printer is provided with a motor (for example, a stepping motor, or the like) for reciprocally driving a carriage on which a print head is placed for printing on recording paper and includes a mechanism adapted to drive the carriage by the driving force of the motor via a transfer mechanism made up of gears, a belt, pulleys, or the like.

In such a mechanism, a controller in the printer transmits a drive signal for driving the motor. A detection mechanism monitors the normal reciprocating movement of the carriage in response to the motor driven by the drive signal.

Detection mechanisms 101 and 201, for example, as shown in FIGS. 13 and 14 have been previously known. As shown in FIG. 13, in the detection mechanism 101, a gear train 103 consisting of a plurality of gears for transferring the driving force of a motor is placed on a frame 102. A gear 104 is also placed on the frame 102 for rotation and is arranged to engage a specific gear of the gear train 103. A detection plate 105 shaped roughly like a disk is placed on a support shaft 104a of the gear 104 and rotates together with the gear 104. The edge of the detection plate 105 has a predetermined number of blades 105a and notches 105b. An optical sensor 106 of transmission type is placed at a position close to the detection plate 105 and a signal output in response to light cut off by the blades 105a of the detection plate 105 is compared with a drive signal of the motor, thereby monitoring the normal reciprocating operation of the print head.

As shown in FIG. 14, in the detection mechanism 201, a detection plate 205 shaped like the detection plate 105 is placed on a support shaft 203a of a specific gear 203b of a gear train 203 and an optical sensor 206 of transmission type detects a blade 205a of the detection plate 205 and similar processing is performed to determine whether or not the print head is normally reciprocating.

U.S. Pat. No. 5,090,829, Japanese Patent Publication No. 1-202462A, and Japanese Patent Publication No. 7-186478A also disclose detection mechanisms similar to those described above.

However, such related detection mechanisms involve the following problems:

For example, in the detection mechanism 101, the separate gear 104 is provided for the detection plate 105, increasing the number of parts. In addition, extra installation space for the gear 104 and the detection plate 105 becomes necessary, hindering miniaturization of the printer; which is a problem.

In the detection mechanisms 101 and 201, stray light from sunlight, a room light, or the like, can cause the optical sensor 106 and 206 to make detection errors. To prevent such detection errors, an additional member for protecting the optical sensor 106, 206 from stray light needs to be provided.

The optical sensor 106, 206 may be placed out of operation because of paper powder or lubricating oil used for maintaining the drive mechanism. Thus, close attention must be paid when lubricating oil is applied for maintenance.

The present invention is intended to solve such technical problems in the related mechanisms. It is an object of the invention to provide a high-reliability, small-sized detection mechanism capable of reliably blocking stray light and interfering substances, such as paper powder, or the like, without requiring an additional protection member for protecting a detector and a printer using the detection mechanism.

SUMMARY OF THE INVENTION

To accomplish the above object, according to the present invention, a detection mechanism is provided for monitoring a moving object comprising: a motor; a drive mechanism for transferring a driving force of the motor to move the object; a rotation body forming a part of the drive mechanism; a base for rotatably supporting the rotation body to define a substantially closed space there between; and a detector located in the closed space for monitoring the rotation of the rotation body.

With such a configuration, the rotation body reliably blocks the detector from the outside, forming an almost entirely enclosed inner space in cooperation with the base. When the rotation body is rotated, the detector detects the rotation of the rotation body within the space. Since the detector is blocked reliably from the outside in the entirely enclosed inner space of the rotation body, the high-reliability detection mechanism is capable of reliably blocking the detector from stray light and interfering substances such as paper powder, or the like, and of avoiding detection errors or detection failure of the detector without providing an additional protection member for protecting the detector. If lubricating oil is scattered with rotation of the rotation body, the detector placed within the rotation body is not affected at all, so that need to manage the amount of lubricating oil applied to the adjacent drive and transfer mechanisms can be avoided.

Further, the need to provide a member for protecting the detector and the desired part is eliminated, and there is no need to provide an additional detected part, so that the number of parts can be reduced, the installation space can be small, and the unit can be miniaturized.

Gears and pulleys of components of the drive and transfer mechanisms can be used as the rotation body of the invention. If a gear is formed with an inner space in which a detector can be enclosed by an integral molding of plastic, one part can provide the function of transferring a driving force, the function of a simple structure protecting the detector, and the function as a detected part. Thus, a compact detection mechanism can be provided and the problems in the related art of deposition and management of lubricating oil is advantageously avoided.

To form an enclosed space between the rotation body and the base supporting the rotation body, a concave region is formed in at least one of the sides of the rotation body and the base where they face each other. Preferably, the base side is formed with a concave part shaped like a circle which is concentric with the rotation body and has a diameter slightly larger than the diameter of the rotation body, and the rotation body is installed in the concave part, whereby the enclosure of the detected drive transfer member and the base can be enhanced and the detector can be more reliably protected.

The detection mechanism of the invention is particularly effective when an optical sensor is used as the detector, because the effect of stray light is eliminated.

To use an optical sensor of the transmission type, having a photo emitter and a photo receptor placed facing each other, the rotation body is provided with a detected part having a comb teeth-like shape and arranged so that the detected part passes through a clearance between the photo emitter and the photo receptor. In this case, if the detected part's comb teeth shape is placed close to the rotation center of the gear, deflection of the projecting part of the teeth caused by rotation of the gear 11 is reduced; thus, the precision of detection of the projecting part is enhanced, making it possible to provide a detection mechanism of high precision.

On the other hand, using an optical sensor of the reflection type, having a photo emitter and a photo receptor placed adjacent to each other, the rotation body has a first segment and a second segment adjacent to each other and differing in their reflection of the light from the photo emitter. To make the reflection by the second segment different from that of the first segment, for example, the distance from the photo emitter or the light detection device to one segment can be made different from the distance from the photo emitter or the light detection device to the other segment. That is, the inner wall of the rotation body can be formed with a difference in level. When, for example, the gear and the detected are integrally molded part of plastic, or the like, and the inner wall of the gear is formed with a difference in level, the invention can be easily embodied so that high dimension precision is not required, mold manufacturing, etc., is facilitated, and a cost advantage is obtained.

The segments can be made different in reflectivity without forming such a difference in level. For example, a monochrome stripe can be printed radially on the inner wall of the gear. In this case, for example, the inner wall of the gear need not be formed with a difference in level, thus mold manufacturing, etc., is facilitated and, in addition, the precision of the optical sensor for detecting the detected part can be enhanced.

The detection mechanism of the invention can be used with a printer comprising: a print head for printing on recording paper; a carriage on which the print head is mounted; a motor; and a drive mechanism for transferring the driving force of the motor to reciprocally move the carriage. The above-described detection mechanism can be connected to the drive mechanism of the carriage and a controller can compare an output pulse of the detection mechanism with a drive pulse of the motor and monitor the operation of the carriage. Thus, a high-reliability, small-sized printer protected from the effect of stray light and interfering substances such as paper powder, or the like, is provided in a simple configuration.

In a printer further including a ribbon transport mechanism for transporting an ink ribbon and a transfer mechanism being connected to the drive mechanism for reciprocally moving the carriage to transfer the driving force of the motor to the ribbon transport mechanism, with the rotation body of the detection mechanism placed in a part of the transfer mechanism, trouble occurring in transporting the ink ribbon can be detected.

DETAILED DESCRIPTION OF THE PREFERRED EMBODIMENTS

Several embodiments of detection mechanism according to the invention will be discussed in detail with reference to the accompanying drawings by taking a printer as an example.

Figure 1:
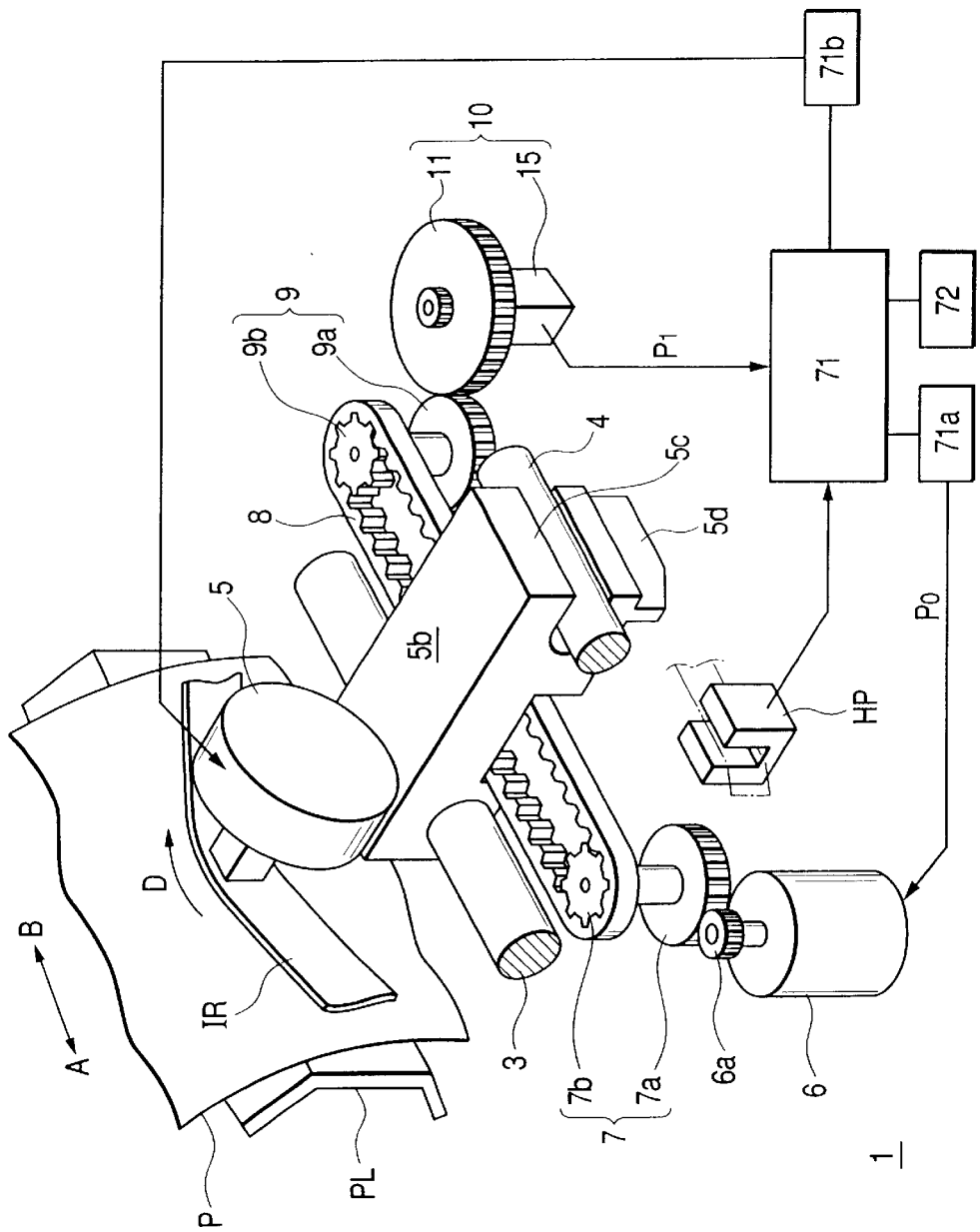
FIG. 1 is a schematic diagram to show a schematic configuration of a printer of one embodiment of the invention.
Figure 2:
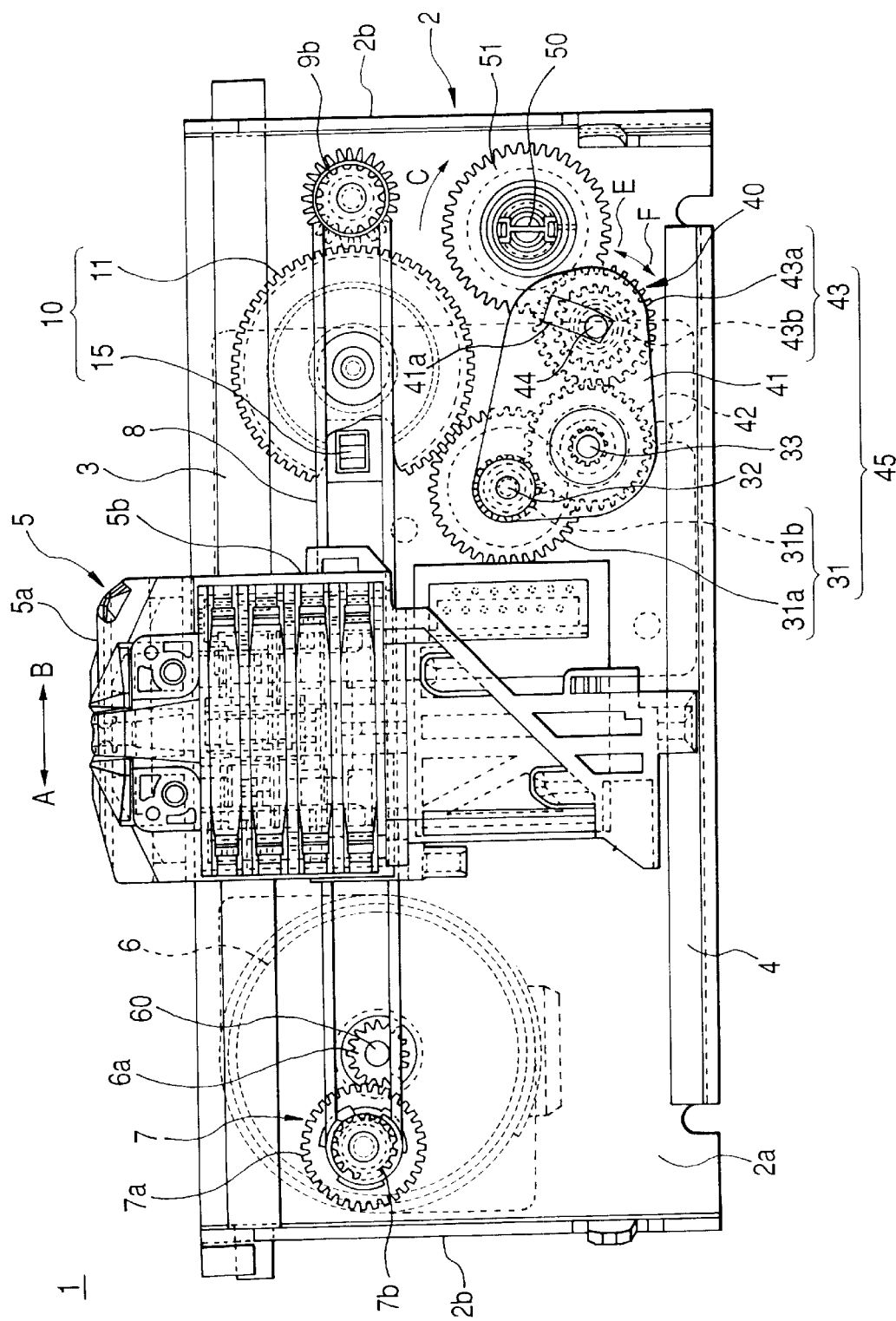
FIG. 2 is a plan view of the printer shown in FIG. 1.
Figure 3:
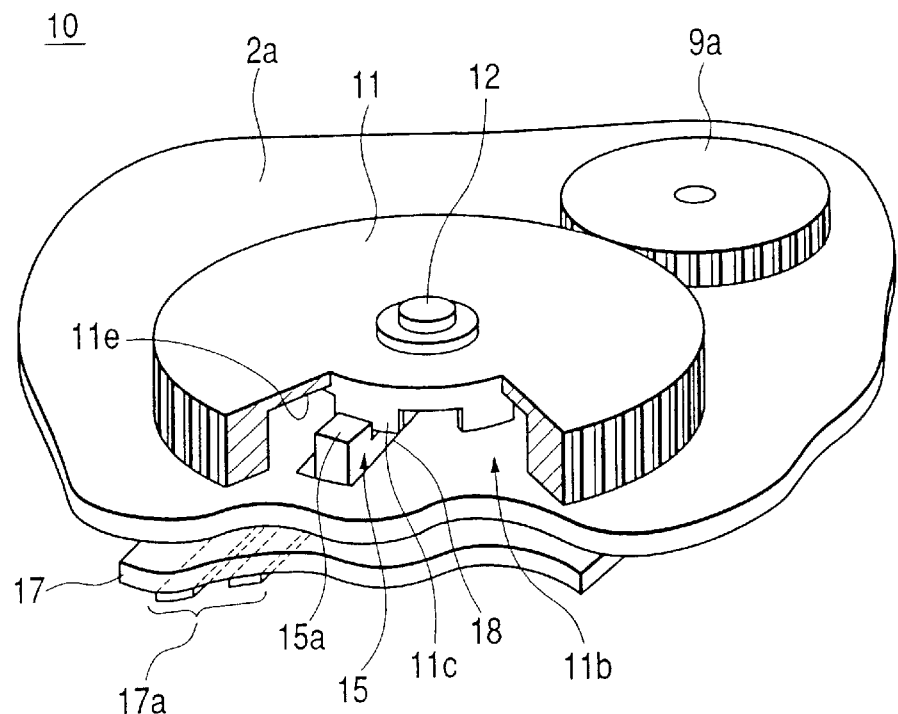
FIG. 3 is a partially cutaway perspective view to show a schematic configuration of a detection mechanism of a first embodiment of the invention.
Figure 4:
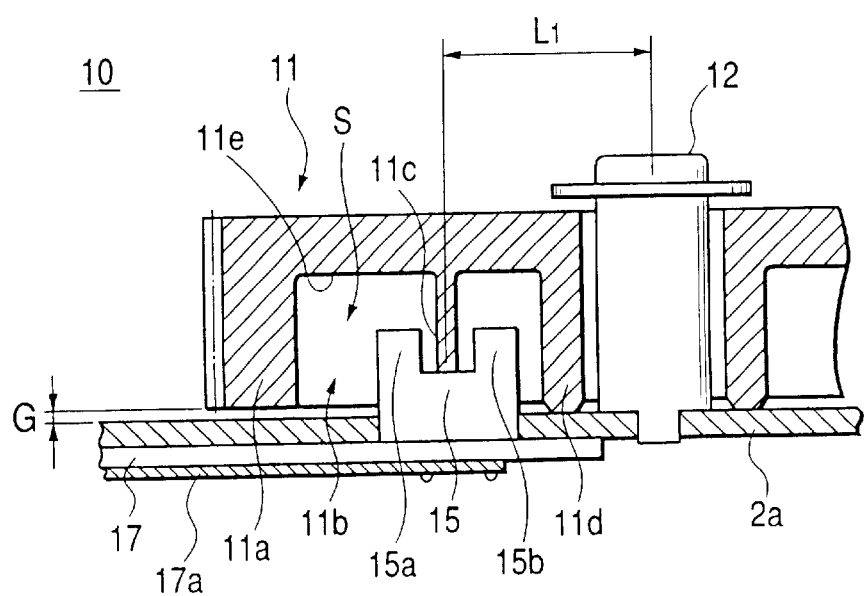
FIG. 4 is a fragmentary sectional side view to show the internal configuration of the detection mechanism shown in FIG. 3.
Figure 5:
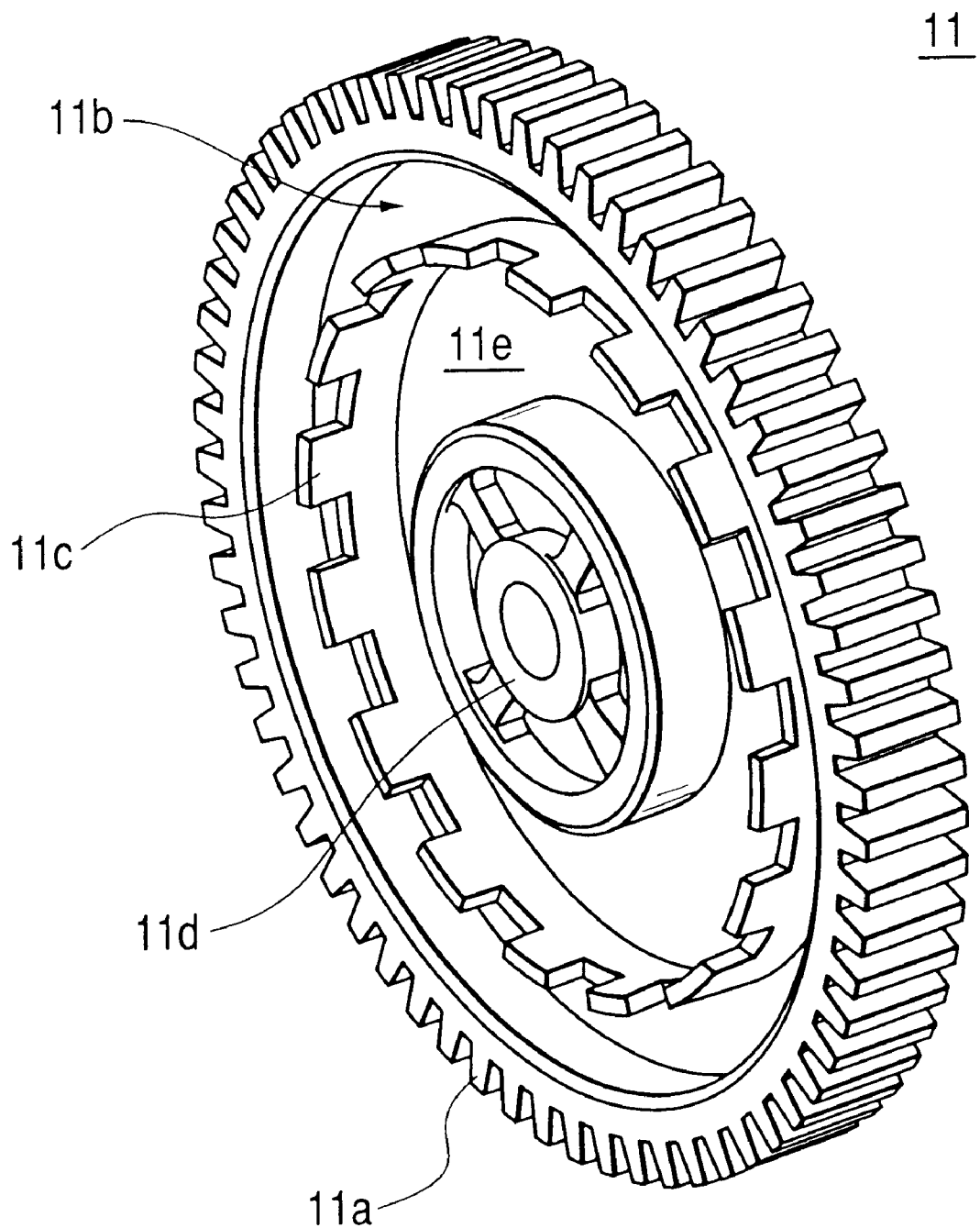
FIG. 5 is a sectional perspective view of a gear of a component of the detection mechanism shown in FIG. 3 from the rear side.
Figure 6:
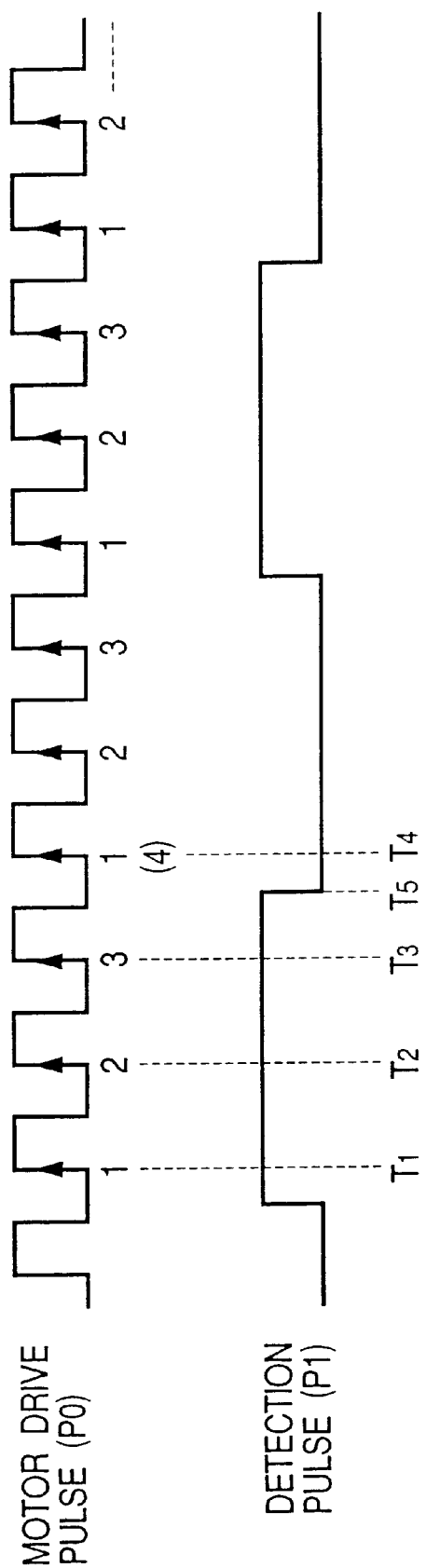
FIG. 6 is a timing chart of a motor drive signal and a detection mechanism output signal in the printer shown in FIG. 1.

FIG. 1 is a schematic diagram to show a schematic configuration of a printer of one embodiment of the invention and FIG. 2 is a plan view of the printer shown in FIG. 1. FIG. 3 is a partially cutaway perspective view to show a schematic configuration of a detection mechanism of a first embodiment of the invention. FIG. 4 is a fragmentary sectional side view to show the internal configuration of the detection mechanism and FIG. 5 is a sectional perspective view of a gear of a component of the detection mechanism from the rear side. FIG. 6 is a timing chart of a motor drive signal and a detection mechanism output signal in the printer shown in FIG. 1.

A printer according to the invention can be applied, for example, to an electronic cash register, or the like, used with a POS system, or the like.

As shown in FIG. 1, a printer 1 transports recording paper P, such as roll paper, for example, used for receipts or single-cut sheets of personal check sheets, or the like, by a transport mechanism (not shown) onto a platen PL and prints on the recording paper P by a dot-impact print head 5 with an ink ribbon IR.

As shown in FIG. 2, the printer 1 has a frame 2, for example, made of metal. The frame 2 is roughly made up of a flat rectangular base 2a and side parts 2b provided perpendicularly to the base 2a on both end sides of the base 2a in the length direction thereof. A rod-like carriage shaft 3 is attached on the rear side of the side parts 2b of the frame (top side of FIG. 2) in parallel with the length of the base 2a. A guide member 4 is placed on the rear side of the base 2a (bottom side of FIG. 2) in parallel with the carriage shaft 3.

A stepping motor 6 is provided on the back side of the base 2a of the frame 2 for reciprocally moving the print head 5 (described later) and feeding the ink ribbon IR. The stepping motor 6 is located on one end side of the carriage shaft and a drive gear 6a is fixed to a drive shaft 60 of the stepping motor 6. The drive gear 6a is placed on the front side of the base 2a.

A drive pulley 7 comprising a gear 7a and a small-diameter pulley 7b, concentric and integrally molded with the gear 7a, is located in proximity to the drive gear 6a of the motor 6 on the base 2a. The gear 7a engages the drive gear 6a.

A rotatable driven pulley 9 comprising a gear 9a and a small-diameter inner pulley 9b, concentric and integrally molded with the gear 9a, is located on the opposite end of the carriage shaft 3 on the base 2. An endless toothed belt 8 is placed on the pulleys 7b and 9b.

A carriage 5b is supported on the carriage shaft 3. The print head 5 comprising a dot-impact print section 5a is mounted on the carriage 5b. The carriage 5b is fixed to one part of the drive belt 8, so that the carriage 5b can be moved in the arrow A or B direction along the carriage shaft 3. An engagement part 5c extends from the carriage 5b to the rear end, supported by the above-described guide member 4. Thus, the carriage 5b can be reciprocally moved in the arrow A and B directions, while maintaining a predetermined orientation. Below the engagement part 5c, a detection plate 5d is molded integrally with the carriage 5b. A home position detector HP, made of a photointerrupter, is provided at one end of the frame 2. When the carriage 5b is moved to a home position, the detection plate 5d is detected by the detector HP. A detection gear 11 engages the gear 9a of the driven pulley 9 and is placed in the proximity of the driven pulley 9. A space S is formed within the detection gear 11 as described later and the detector is located in the inner space S.

A gear 31, supported for rotation on a support shaft, is placed in the proximity of the detection gear 11. The gear 31 comprises an outer gear 31a and a small-diameter inner gear 31b, concentric and integrally molded with the outer gear 31a. The outer gear 31a engages the detection gear 11.

A plate lever 41 is supported on the support shaft 32 for rotation. A support shaft 33 is placed in a part on the lower face side of the lever 41 and a planetary gear 42 is supported on the support shaft 33 to engage the gear 31b. A spring member (not shown) is sandwiched between the planetary gear 42 and the lever 41. That is, the planetary gear 42 is supported for rotation on the support shaft 33 while it receives frictional force from the above-mentioned spring member when the planetary gear 42 engages the gear 31b.

A gear 43 comprises an outer gear 43a and a small-diameter inner gear 43b, integrally molded and concentric with the outer gear 43a, supported on a support shaft 44 for rotation. The gear 43b always engages a gear 51 placed on a base section of a winding spool 50.

The lever 41 comprises a guide groove 41a through which the support shaft 44 of the gear 43 passes. The lever 41 is limited in its up and down movement by the support shaft 44 and the guide groove 41a. The range through which the lever 41 is rotated on the support shaft 32 is determined by the length of the guide groove 41a. As a result, in the printer 1 in the example, the planetary gear 42 and the gear 31b are arranged to engage and disengage each other as the lever 41 is rotated.

A ribbon cassette (not shown), storing a caterpillar-like ink ribbon IR, is mounted on the frame 2. The ribbon cassette contains a winding roller (not shown) for winding and circulating the ink ribbon IR. When the ribbon cassette is mounted on the frame, the winding roller engages the winding spool 50 and the driving force of the motor 6 is transferred to the winding roller. Therefore, in the printer 1, the driving force of the motor 6 is transferred via the drive pulley 7 and the belt 8, so that the print head 5 moves reciprocally in the arrow A or B direction along the carriage shaft 3. If the print head 5 is moved in the arrow A direction, the gear 31 is rotated counterclockwise (in FIG. 2), attempting to rotate the planetary gear 42 clockwise. However, the planetary gear 42 does not rotate relative to the support shaft 33 because of the frictional load of the spring member sandwiched between the planetary gear 42 and the lever 41. Thus, the lever 41 rotates on the support shaft 32 counterclockwise, namely, in the arrow E direction. At this time, the lever 41 is guided by the support shaft 44 of the gear 43 inserted into the guide groove 41a in the lever 41, and is rotated in the arrow E direction to the position at which the planetary gear 42 engages the gear 43. When the gear 31 is further rotated counterclockwise, after the position at which the planetary gear 42 engages the gear 43 is reached, the planetary gear 42 is rotated clockwise on the support shaft 33 in spite of the frictional force with the lever 41, and transfers the driving force to the gear 43, rotating the gear 43 counterclockwise. The gear 51 engages the gear 43 and is rotated clockwise (in the arrow C direction).

When the print head 5 is diverted from the arrow A direction and is moved in the arrow B direction, the gear 31 is rotated in the opposite direction to that described above and the lever 41 is rotated on the support shaft 32 clockwise (in the arrow F direction), the planetary gear 42 and the gear 31b are disengaged. At this time, the lever 41 is guided by the support shaft 44 inserted into the guide groove 41a in the lever 41. The lever 41 is rotated in the arrow F direction until the support shaft 44 abuts one end of the guide groove 41a.

Thus, only if the print head 5 is moved in the arrow A direction, the driving force of the drive motor 6 is transferred through a transfer mechanism 45 (gear 11 to gear 43) to the winding spool 50, whereby the ink ribbon IR is transported in the arrow D direction.

As shown in FIGS. 3 and 4, a detection mechanism 10 has the detection gear 11 rotated with reciprocal movement of the carriage 5b and an optical sensor of transmission type (photointerrupter) 15 for detecting rotation of the detection gear 11.

The support shaft 12 is fixed to the base 2a of the frame 2 by caulking, for example, for supporting the detection gear 11 for rotation.

The detection gear 11 is a spur gear made of plastic. It has a bearing 11d engaging the support shaft 12 on the center side and teeth to engage the gear 9a and the gear 31b on an outer peripheral surface 11a. A concave part 11b is formed concentrically with the bearing 11d on one face of the detection gear 11, namely, the side facing the base section 2a. The detection gear 11 is attached to the support shaft 12 with the concave part 11b directed toward the base section 2a, whereby the space S for placing the optical sensor 15 is formed between the base section 2a and the detection gear 11.

As shown in FIGS. 3 to 5, comb teeth 11c concentric with the detection gear 11 are placed on an inner wall 11e of the bottom face of the concave part 11b. The comb teeth 11c each has a predetermined width. They are spaced from each other with a predetermined spacing and are placed concentrically at a distance L1 from the rotation center of the detection gear 11. The comb teeth 11c are molded integrally with the detection gear 11. Preferably, the distance L1 is as small as practical, because deflection of the comb teeth 11c caused by rotation of the detection gear 11 is reduced and, thus, it can be expected that the precision of the optical sensor 15 for detecting the comb teeth 11c will be enhanced.

The optical sensor 15 is of the transmission type. It is fixed to a wiring board 17. Terminals of the optical sensor 15 are connected to leads 17a printed on the rear face of the wiring board 17 and the leads 17a also are connected to a controller 71, described later.

A hole 18 slightly larger than the optical sensor 15 is made in the base section 2a of the frame 2. The optical sensor 15 is exposed through the hole 18. The wiring board 17 is fixed to the frame 2 so that it is in intimate contact with the rear face of the base section 2a.

The optical sensor 15 has two arms. Photo emitter 15a is placed on one arm and a photo receptor 15b is placed on the other arm so that the photo emitter 15a and the photo receptor 15b face each other. The optical sensor 15 is placed in the space S formed between the detection gear 11 and the base section 2a so that each comb tooth 11c passes through the gap between the photo emitter 15a and the photo receptor 15b. Therefore, when the detection gear 11 is rotated and one of the comb teeth 11c is present between the photo emitter 15a and the photo receptor 15b, light from the photo emitter 15a to the photo receptor 15b is interrupted by the comb tooth 11. When the clearance between the adjacent teeth 11c is present between the photo emitter 15a and the photo receptor 15b, light emitted from the photo emitter 15a is incident on the photo receptor 15b. Therefore, a pulse of a period responsive to the rotation speed of the detection gear is produced from the optical sensor 15.

A narrow gap G is formed between outer peripheral portion 11a of the detection gear 11 and the base 2a. The gap G has a size sufficient that rotation of the detection gear 11 is not hindered. Namely, the gap G is defined such an extent that the outer peripheral portion 11a does not come in contact with the base 2a with taking account of the tolerance of the related parts and that the effect by the enclosed space S is not impaired. In such a structure, the optical sensor 15 is covered by the detection gear 11 and the base 2a, and the space S in which the optical sensor 15 is placed is kept in an almost entirely closed state.

As descried above, the optical sensor 15 of the detection mechanism 10 is housed in the inner space S almost entirely enclosed by the detection gear 11 and the base 2a. Thus, it does not receive stray light and, therefore, does not make detection errors. It is also protected from the lubricating oil applied to the gears, or the like, paper powder deposited on recording paper, or the like. It is housed in the gear, so that the installation space is small and the advantage for miniaturizing the unit is also attained.

Next, a controller for monitoring the reciprocating operation of the carriage and a method will be discussed with FIGS. 1 and 6.

As shown in FIG. 1, the controller 71 for controlling the printer 1 controls the print head 5 through a driver 71b and the motor 6 through a driver 71a, based on print data and commands received from a host. A counter 72, for counting drive pulse output to the motor 6, is connected to the controller 71. The controller 71 consists of a microprocessor, ROM storing a program for defining the operation of the microprocessor and the like, RAM for temporarily storing print data and the like. The controller 71 executes the process discussed below.

FIG. 6 is a timing chart showing a motor drive signal and a detection mechanism output signal in the printer 1.

Upon reception of print data from the host, the controller 71 applies drive pulses P0 to the stepping motor 6 to move the print head 5 from the home position to a print area (in FIG. 1, in the arrow B direction from HP). After the print head 5 arrives at the print area, the print head 5 is energized selectively according to the print data, in synchronization with the drive pulse P0.

When the stepping motor 5 is driven, the detection gear 11 also rotates. As the detection gear 11 rotates, a detection pulse P1 is outputted from the optical sensor 15 installed in the detection gear 11. As shown in FIG. 6, in the printer 1 of the example, when the motor 6 is turned six steps, a detection pulse P1 of one period is outputted and the detection pulse P1 is compared with the motor drive pulse P0 and the carriage operation is monitored.

The counter 72 counts one in one period of the drive pulse P0 of the motor 6. At time T1, the counter 72 count is one. At this time, the controller 71 checks whether the detection pulse P1 is high or low, and temporarily stores the detected state. In FIG. 6, the detection pulse state is high at time T1 and thus the high state is stored.

At time T2, the detection pulse state is checked again and, if it equals the preceding detection pulse state (at time T1), the count of the counter 72 is incremented by one. On the other hand, if the detection pulse state differs from the preceding state, the value of the counter 72 is reset to 1.

In FIG. 6, the detection pulse state at time T2 equals that at time T1 and the detection pulse state at time T3 equals that at time T2, thus the value of the counter at time T3 becomes three. On the other hand, the detection pulse state at time T4 differs from the preceding state (at time T3), therefore, the value of the counter 72 is reset to 1.

If the carriage is normally driven, the phase of the detection pulse P1 (high, low) changes periodically, therefore, the value of the counter is reset whenever the counter counts a predetermined value (in the example, three). On the other hand, if the motor 6 becomes out of synchronism for some reason or the carriage is not normally driven, the phase of the detection pulse P1 is not changed. In that case, the count of the counter 72 becomes larger than the normal value. If an anomaly occurs, the phase of the detection pulse P1 remains high at time T5 as indicated by the phantom line in FIG. 6. In that case, at time T4, the value of the counter is increased to four. Thus, if the value of the counter 72 becomes one added to the number of drive pulses P0 corresponding to a half period of the detection pulse P1 (in the example, four), the controller 71 judges that the carriage is not normally driven, aborts the print processing, and uses an LED, or the like, placed on the cabinet of the printer to indicate that an error has occurred.

Figure 7:
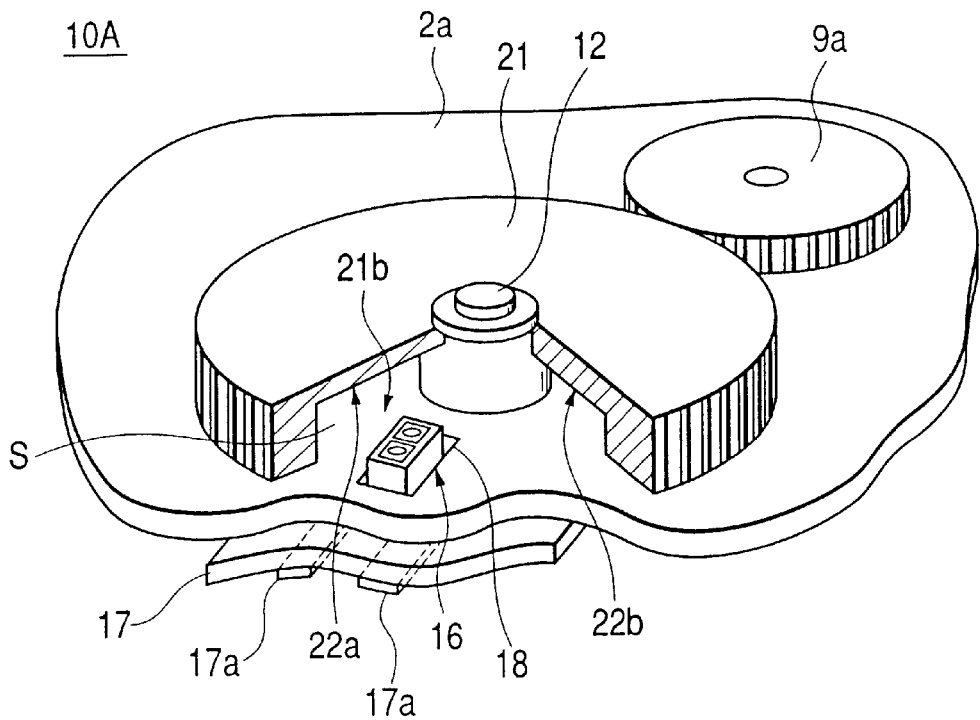
FIG. 7 is a partially cutaway perspective view to show a schematic configuration of a detection mechanism of a second embodiment of the invention.
Figure 8:
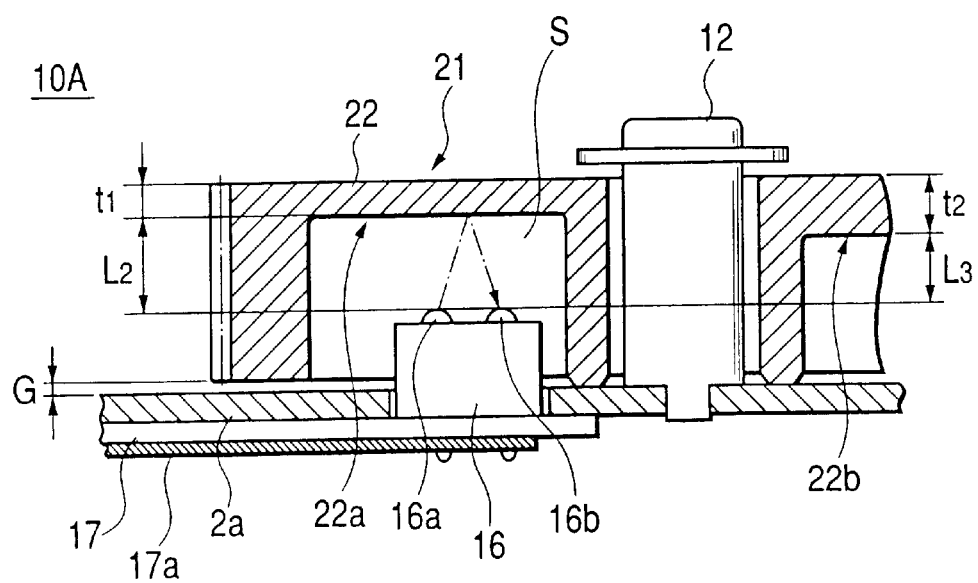
FIG. 8 is a fragmentary sectional side view to show the internal configuration of the detection mechanism shown in FIG. 7.
Figure 9:
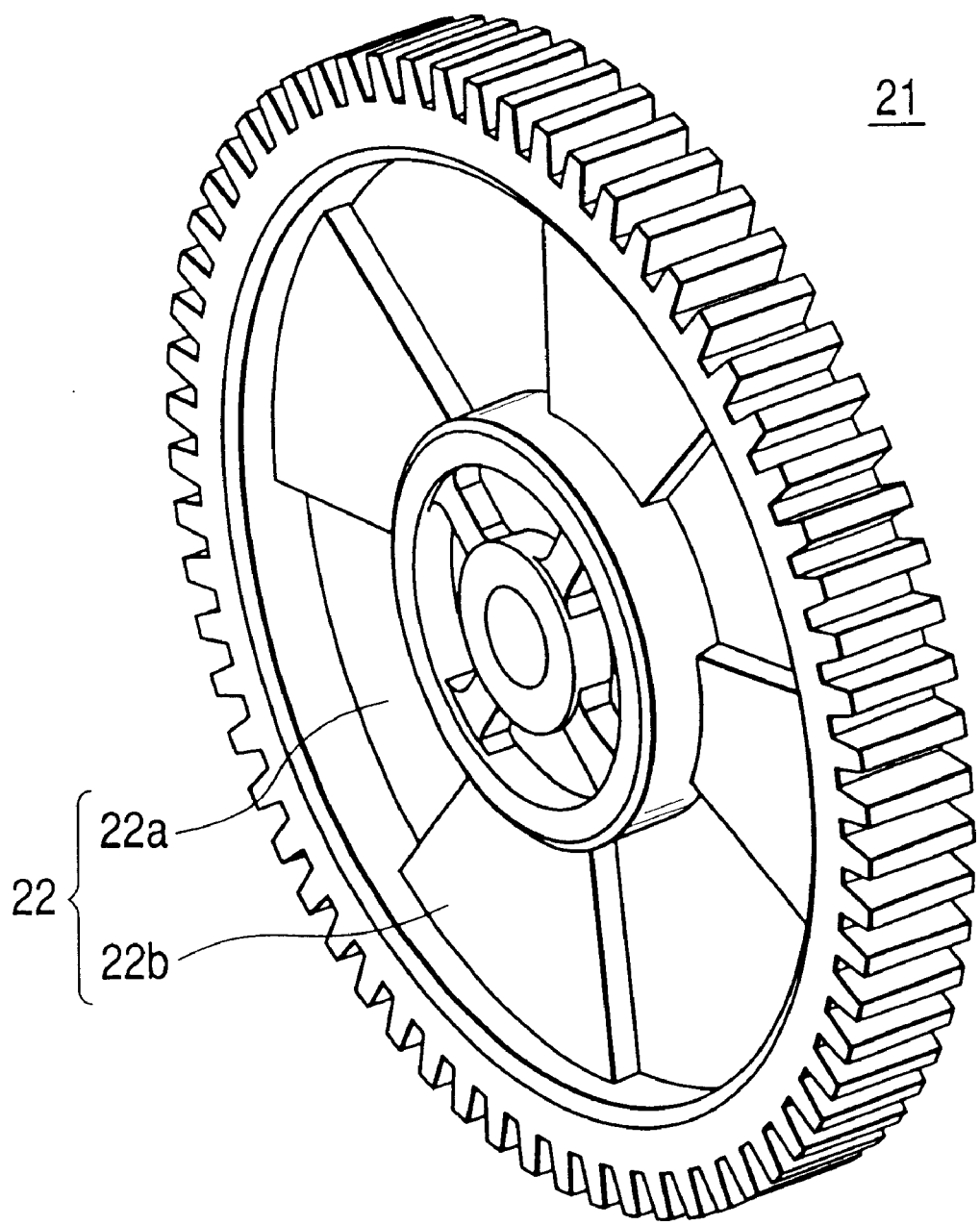
FIG. 9 is a sectional perspective view of a gear of a component of the detection mechanism shown in FIG. 7 from the rear side.

Next, a detection mechanism of a second embodiment of the invention will be discussed with FIGS. 7 to 10. FIG. 7 is a partially cutaway perspective view to show a schematic configuration of the second embodiment of the invention and FIG. 8 is a fragmentary side view to show a detection mechanism of this embodiment. FIG. 9 is a sectional perspective view of a gear of a component of the detection mechanism from the rear side. Parts corresponding to those of the above-described embodiment are denoted by the same reference numerals and will not be discussed again in detail.

A detection mechanism 10A of this embodiment differs from the detection mechanism of the above-described embodiment in that it has a detection gear 21 different in shape from the above-described detection gear 11 and uses an optical sensor 16 of reflection type. Also in this embodiment, a space S for housing the optical sensor is formed by a concave part 21 formed like a concentric circle with the detection gear 21. However, detection segments 22a and 22b, which differ in thickness, are placed periodically along a circumferential direction on a wall 22 of the bottom surface of the concave part 21b.

The first segment 22a is formed by a portion where the thickness of the wall 22 is t1, and the second segment 22b is formed by a portion where the thickness of the wall 22 is t2. (t2>t1) A photo emitter 16a and a photo receptor 16b are placed with a predetermined spacing on the top face of the optical sensor 16. Distance L2 from the first segment 22a to the photo emitter 16a or the photo receptor 16b of the optical sensor 16 is larger than distance L3 from the second segment 22b. Therefore, when the second segment 22b faces the photo emitter 16a, the light intensity of light incident on the photo receptor 16b is higher than that when the first segment 22a faces the photo emitter 16a. As a result, if the detection gear 21 is rotated, a pulse of a period responsive to the rotation speed of the detection gear 21 is outputted from the optical sensor 16.

Figure 10:
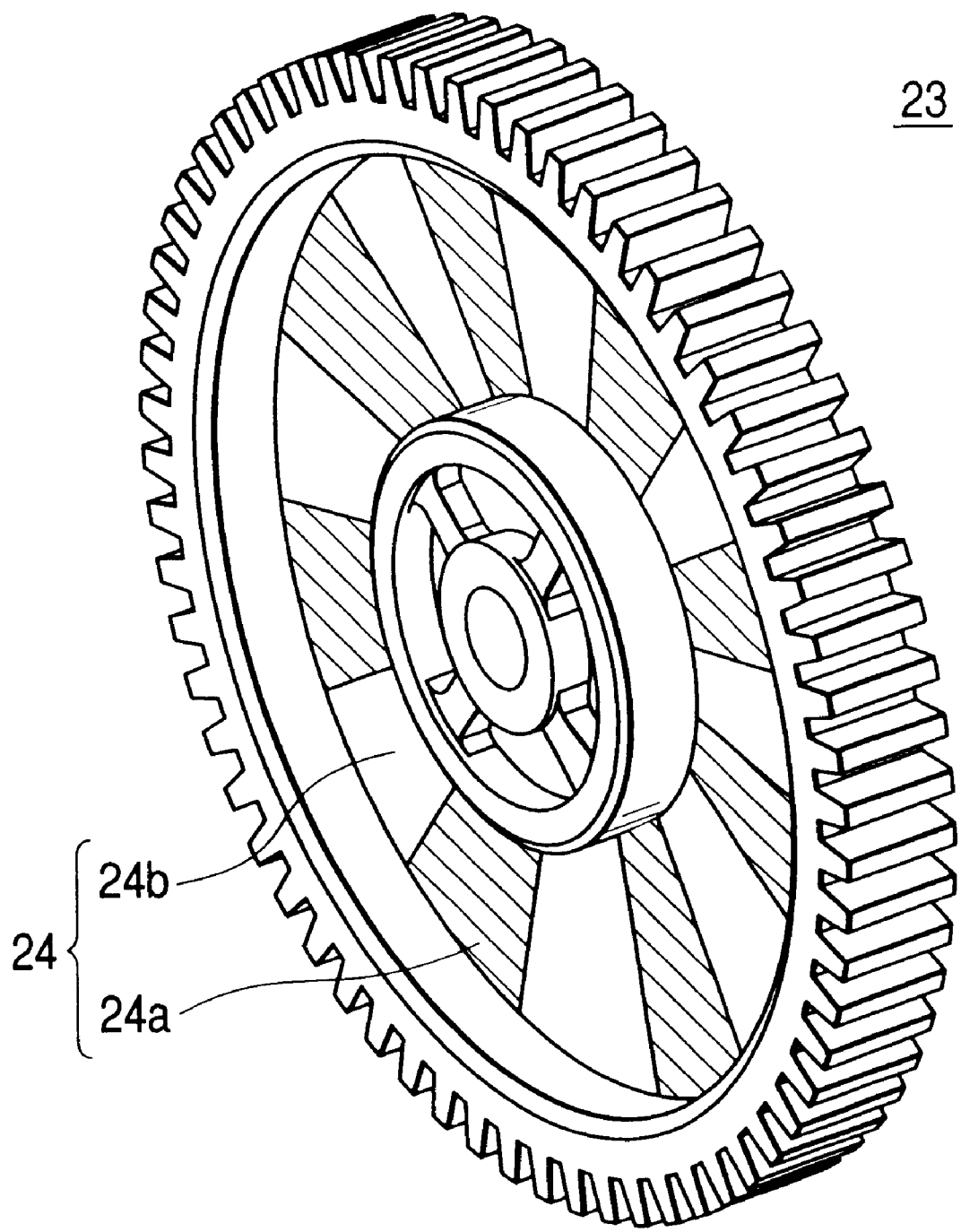
FIG. 10 is a sectional perspective view to show another example of the gear of the detection mechanism.

When using the optical sensor of reflection type, a detection gear 23 comprising detection segments 24a and 24b on a bottom face 24 of a concave part shown in FIG. 10 can be adopted in place of the detection gear 22 comprising the detection segments different in distance from the optical sensor. A color of comparatively low reflectivity (for example, black) is printed on the surface of the first segment 24a and a color of comparatively high reflectivity (for example, white, silver) is printed on the surface of the first segment 24b. As with the detection gear 21, when the second segment 24b faces the photo emitter 16a, the light intensity of light incident on the photo receptor 16b becomes higher than that when the first segment 24a faces the photo emitter 16a. When the detection gear 23 is rotated, a pulse of a period responsive to the rotation speed of the detection gear 23 is outputted from the optical sensor 16.

The detection segments which differ in distance from the optical sensor and those which differ in reflectivity can be used in combination.

Figure 11:
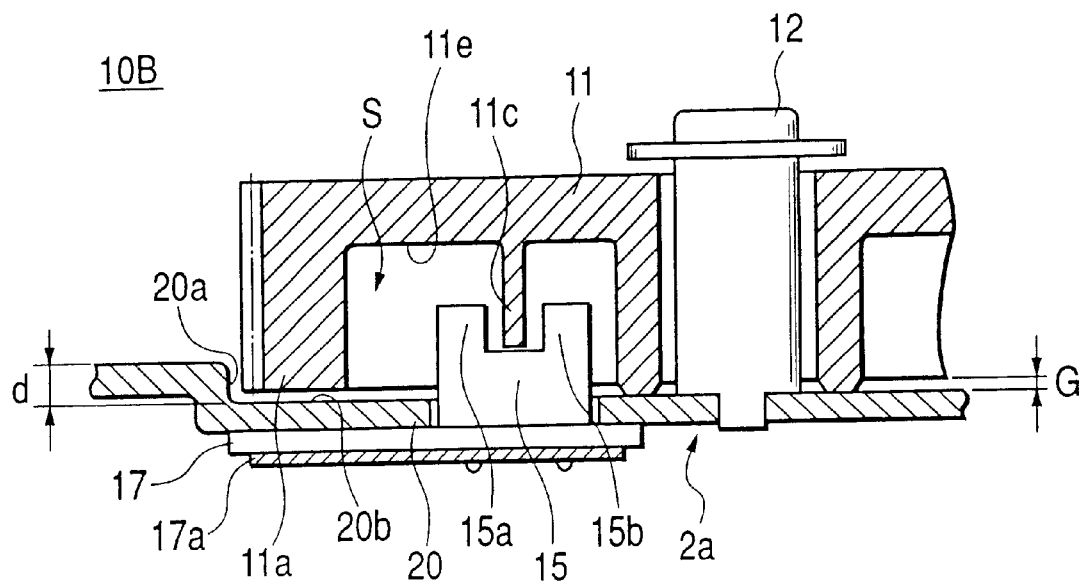
FIG. 11 is a partially cutaway perspective view to show a schematic configuration of a detection mechanism of a third embodiment of the invention.

FIG. 11 is a fragmentary sectional side view to show the internal configuration of a third embodiment of detection mechanism according to the invention. Parts corresponding to those of the above-described embodiment are denoted by the same reference numerals and will not be discussed again in detail. As shown in FIG. 11, in a detection mechanism 10B of this embodiment, a base 2a of a frame 2 differs in shape from that in the above-described embodiment. That is, the base 2a of the frame 2 is formed with a concave part 20 having a slightly larger diameter than the diameter of a detection gear 11 and the detection gear 11 is attached to the concave part 20.

Inner walls 20a of the concave part 20 are formed perpendicularly to a bottom part 20b and depth d of the concave part 20 is formed deeper than the size of a gap G between an outer peripheral portion 11a of the detection gear 11 and the bottom part 20b of the frame 2. This structure makes possible to enhance the effect for enclosing the inner space S of the detection gear 11 and for protecting optical sensor 15 more reliably. In this example, the detection mechanism using the optical sensor of transmission type has been described; however, the optical sensor of reflection type and its corresponding detection gear shown in FIG. 7 also can be used as an alternative. Other components and functions are the same as those in the above-described embodiment and therefore will not be discussed again in detail.

Figure 12:
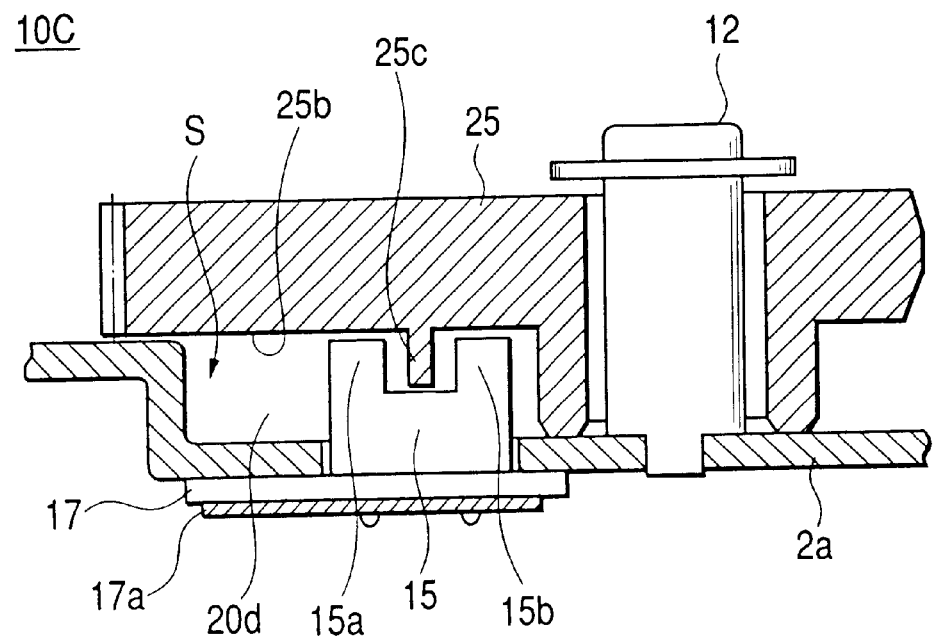
FIG. 12 is a partially cutaway perspective view to show a schematic configuration of a detection mechanism of a fourth embodiment of the invention.
Figure 13:
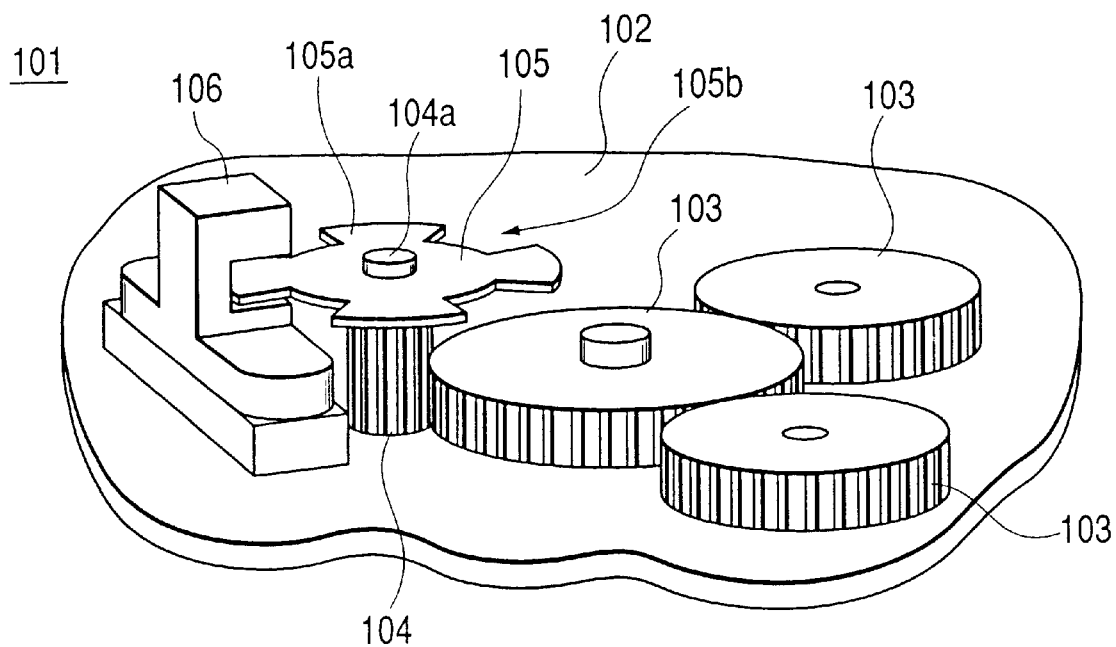
FIG. 13 is a perspective view to show a schematic configuration of a related detection mechanism.
Figure 14:
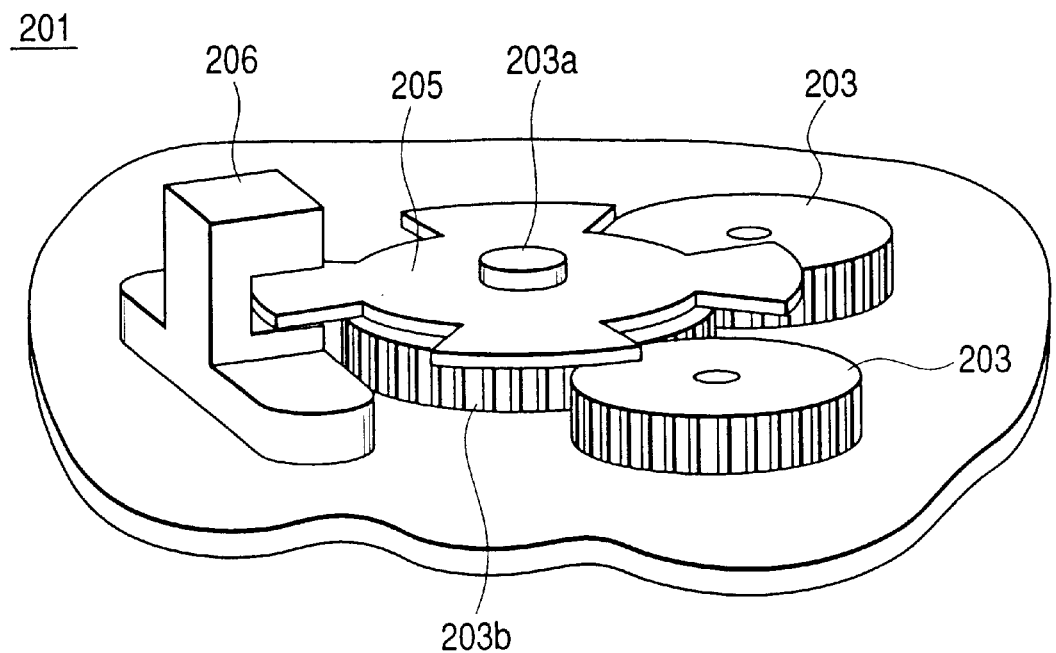
FIG. 14 is a perspective view to show a schematic configuration of another related detection mechanism.

FIG. 12 is a fragmentary sectional side view showing the internal configuration of a fourth embodiment of detection mechanism according to the invention. Parts corresponding to those of the above-described embodiments are denoted by the same reference numerals and will not be discussed again in detail. As shown in FIG. 12, in a detection mechanism 10C of this embodiment, a space S for housing an optical sensor 15 is formed mainly by a concave part 20d formed on a base 2a of a frame 2. That is, the concave part 20d having a smaller diameter than the diameter of a detection gear 25 and the detection gear 25 is attached to the concave part 20d. A detected member 25c, having a shape like comb teeth, is placed on the side of the detection gear 25 facing the base 2a. When the gear 25 of is formed metal and the shape of the gear side is thus simplified, it can be easily manufactured at a reduced cost. Of course, in the example, the optical sensor of reflection type can also be used, in which case the detected member having a shape like comb teeth becomes unnecessary, so that the gear can be made more easily.

The invention is not limited to the above-described embodiments and various modifications can be made.

In the above-described embodiments, the optical sensors are used as the detectors of the detection mechanisms, but the invention is not limited thereto; various sensors including noncontact-type sensors, such as a magnetic sensor, can be used for the detectors. However, the optical sensor used as in the above-described embodiments has the advantage that a small-sized detection mechanism can be provided. In the description of the above-described embodiments, the gears are taken as examples of the rotation bodies of the detection mechanisms, but a space for housing a detector also can be formed between a pulley as one element of a drive mechanism and a base for supporting it.

Further, the detection mechanism of the invention is used with the drive mechanism of the dot-impact print head; it can also be applied to a carriage feed mechanism of a thermal or ink jet printer. It can also be used with other drive mechanisms of the printers. For example, it can be used as a detection mechanism for monitoring the operation of a paper feed roller in a paper feed mechanism of a printer, or the like, and can also be used as a detection mechanism for monitoring the operation of rollers and spools for transporting a tape ribbon in a tape ribbon feed mechanism of a tape printer. It can be applied not only to printers, but also to various mechanisms wherein detectors need to be protected from stray light, interfering substance, or the like. For example, it can be applied to a detection mechanism for monitoring the operation of a carriage in an X–Y plotter comprising a pen mounted on the carriage for scanning the carriage for printing on paper, a cutting unit comprising a cutter mounted on the carriage for cutting paper, or the like, an image scanner comprising a light source and an optical sensor mounted on the carriage for scanning the carriage for inputting an image, or the like.

What is claimed is:

1. A detection mechanism for monitoring a moving object comprising:
   a motor;
   a drive mechanism for transferring a driving force of the motor to move the object;
   a rotation body forming a part of the drive mechanism;
   a base for rotatably supporting the rotation body and defining a substantially closed space between the base and the rotation body; and a detector located in the closed space for monitoring the rotation of the rotation body.

2. The detection mechanism as set forth in claim 1, wherein the rotation body includes at least one of a gear and a pulley.

3. The detection mechanism as set forth in claim 1, wherein a concave section is formed in at least one of the rotation body and the base to define the closed space.

4. The detection mechanism as set forth in claim 3, wherein the concave section is formed in the base, has a concentric shape with the rotation body and has a larger diameter than the rotation body, and the rotation body is located in the concave section.

5. The detection mechanism as set forth in claim 1, wherein the detector is an optical sensor.

6. The detection mechanism as set forth in claim 5, wherein the optical sensor is a transmission type optical sensor including a photo emitter and a photo receptor which are opposed to each other; and wherein the rotation body includes detected members shaped like comb teeth which are placed to pass through a space between the photo emitter and the photo receptor.

7. The detection mechanism as set forth in claim 5, wherein the optical sensor is a reflection type optical sensor including a photo emitter and a photo receptor which are arranged adjacent to each other; and wherein the rotation body includes a first segment and a second segment which are arranged adjacent to each other and differ in the characteristic of light reflection from the photo emitter.

8. The detection mechanism as set forth in claim 7, wherein the first segment is placed at a position away from the optical sensor by a first distance, and the second segment is placed at a position away from the optical sensor by a second distance which is different from the first distance.

9. The detection mechanism as set forth in claim 7, wherein the first segment has a first reflectivity and the second segment has a second reflectivity which is different from the first reflectivity.

10. A carriage monitoring device for a printer comprising:

a print head for printing on recording paper;

a carriage for mounting the print head;

a motor;

a drive mechanism for transferring a driving force of the motor to reciprocally move the carriage, the drive mechanism including a rotation body rotatably supported on a base so as to define a substantially closed spaced between the base and the rotation body;

a detector located in the closed space for monitoring the rotation of the rotation body; and a controller for comparing an output pulse from the detection mechanism with a drive pulse for driving the motor to monitor the movement of the carriage.

11. The detection mechanism as set forth in claim 10, wherein the rotation body includes at least one of a gear and a pulley.

12. The detection mechanism as set forth in claim 10, wherein a concave section is formed in at least one of the rotation body and the base to define the closed space.

13. The detection mechanism as set forth in claim 12, wherein the concave section is formed in the base, has a concentric shape with the rotation body and has a larger diameter than the rotation body, and the rotation body is located in the concave section.

14. The detection mechanism as set forth in claim 10, wherein the detector is an optical sensor.

15. The detection mechanism as set forth in claim 14, wherein the optical sensor is a transmission type optical sensor including a photo emitter and a photo receptor which are opposed to each other; and wherein the rotation body includes detected members shaped like comb teeth which are placed to pass through a space between the photo emitter and the photo receptor.

16. The detection mechanism as set forth in claim 14, wherein the optical sensor is a reflection type optical sensor including a photo emitter and a photo receptor which are arranged adjacent to each other; and wherein the rotation body includes a first segment and a second segment which are arranged adjacent to each other and differ in the characteristic of light reflection from the photo emitter.

17. The detection mechanism as set forth in claim 16, wherein the first segment is placed at a position away from the optical sensor by a first distance, and the second segment is placed at a position away from the optical sensor by a second distance which is different from the first distance.

18. The detection mechanism as set forth in claim 16, wherein the first segment has a first reflectivity and the second segment has a second reflectivity which is different from the first reflectivity.

19. A printer comprising:

a print head for printing on recording paper;

a carriage for mounting the print head;

a motor;

a drive mechanism for transferring a driving force of the motor to reciprocally move the carriage, the drive mechanism including a rotation body rotatably supported on a base so as to define a substantially closed space between the base and the rotation body;

a detector located in the closed space for monitoring the rotation of the rotation body; and a controller for comparing an output pulse from the detection mechanism with a drive pulse for driving the motor to monitor the movement of the carriage.

20. The printer as set forth in claim 19, further comprising:

a ribbon transport mechanism for transporting an ink ribbon; and a transfer mechanism connected to the driving mechanism for transferring the driving force of the motor to the ribbon transport mechanism, wherein the rotation body in the detection mechanism is arranged as a part of the transfer mechanism.

* * * * *